United States Patent [19]
Kristen et al.

[11] 3,911,299
[45] Oct. 7, 1975

[54] HIGH SPEED COMMUTATORLESS D.C. MOTOR

[75] Inventors: Reiner Kristen; Manfred Liska; Peter Tschirner, all of Nurnberg; Hans Kuhnlein, Grossgrundlach, all of Germany

[73] Assignee: Siemens Aktiengesellschaft, Munich, Germany

[22] Filed: Jan. 28, 1974

[21] Appl. No.: 437,229

[30] Foreign Application Priority Data
Feb. 16, 1973 Germany.......................... 2307800

[52] U.S. Cl................................. 310/64; 310/179
[51] Int. Cl.² ......................................... H02K 9/22
[58] Field of Search ..... 310/40, 156, 64, 65, 85–87, 310/179, 260, 57, 58, 270

[56] References Cited
UNITED STATES PATENTS

| | | | |
|---|---|---|---|
| 3,082,337 | 3/1963 | Horsley.............................. | 310/179 |
| 3,508,092 | 4/1970 | Hallidy................................ | 310/64 |
| 3,529,192 | 9/1970 | Davies ................................ | 310/179 |
| 3,593,049 | 7/1971 | Dittrich et al. ..................... | 310/156 |
| 3,761,752 | 9/1973 | Anderson............................ | 310/179 |

Primary Examiner—Donovan F. Duggan
Attorney, Agent, or Firm—Kenyon & Kenyon Reilly Carr & Chapin

[57] ABSTRACT

According to the invention the stator winding of a commutatorless d-c motor used particularly for drives of grinding spindles and spinning turbines is bell-shaped and embedded in insulating material in such a manner that the heat transfer resistance between the stator winding and the permanentmagnet rotor is higher than the heat transfer resistance between the stator winding and the stator return yoke. This avoids additional heating of the bearings by losses in the stator winding and facilitates the replacement of the bearings.

6 Claims, 1 Drawing Figure

U.S. Patent   Oct. 7, 1975   3,911,299
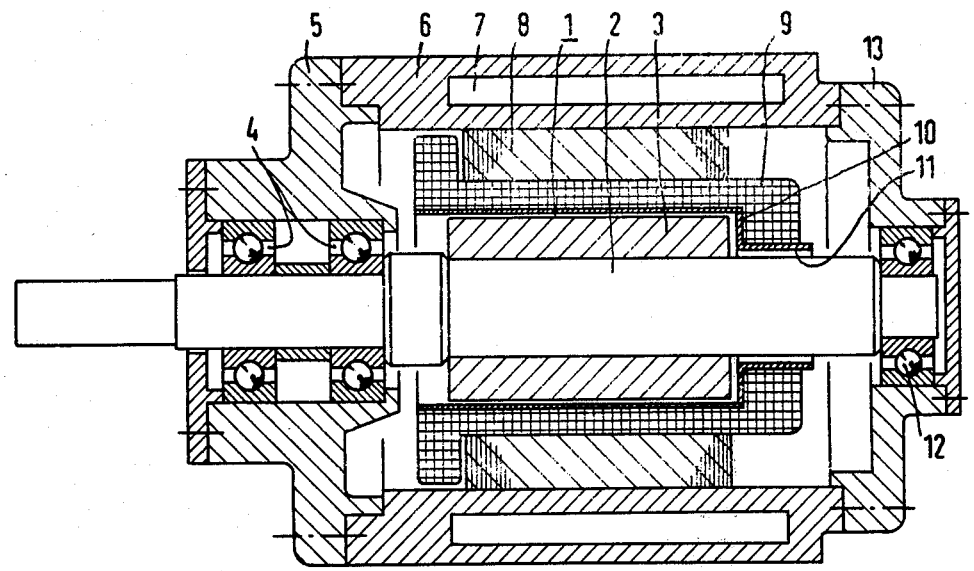

HIGH SPEED COMMUTATORLESS D.C. MOTOR

BACKGROUND OF THE INVENTION

1. Field of the Invention

The invention concerns a commutatorless d-c motor for high speeds, but more particularly one wherein the stator winding is arranged between the two bearings of the permanent-magnet rotor, surrounded by the stator return yoke.

2. Description of the Prior Art

High speed commutatorless d-c motors, i.e. speeds over 10,000 r.p.m. are well known in the art; see for example the article in the publication entitled "Elektrotechnische Zeitschrift" B, Vol. 24 (1972), No. 12, p. 295 to p. 298. Because of the speeds involved, these motors require the use of special bearings which have a relatively short service life. Accordingly these bearings must be replaced frequently. However, an added complication is the fact that because of the high speeds, great concentricity of the permanent-magnet rotor is required. Thus it is not possible to pull a defective bearing off the shaft of the rotor by itself and replace it. Rather, it is necessary to remove the rotor from the motor and to examine it for concentricity once a new bearing has been installed.

An additional problem associated with high speed motors is the generation of excessive heat in the stator windings. The problem develops because the excessive heat can be radiated to the rotor from the stator. The temperature rise of the rotor is transmitted via the shaft to the close-tolerance bearings and, due to the change in the bearing clearance, can lead to a greater mechanical stress of the bearings.

It is therefore an object of the invention to design a commutatorless d-c motor for high speed in such a manner that a defective bearing can be replaced easily and the additional thermal stress of the bearings can be minimized.

SUMMARY OF THE INVENTION

According to the invention, the solution of the stated problem is made possible by making the stator winding bell-shaped and embedding it in insulating material in such a manner that a high heat transfer resistance exists at the inside surface of the stator winding which faces the permanent-magnet rotor, and a low heat transfer resistance exists at the outside surface which is in contact with the stator return yoke.

According to one embodiment of the invention, an insulating layer with low thermal conductivity is applied on the inside surface of the bell-shaped stator winding. Different conductivity at the inside and outside surface of the stator winding can be achieved in a simple manner by providing that the bell-shaped stator winding be cast over with a plastic, whose thermal conductivity increases from the inside surface toward the outside surface. Different thermal conductivity of the plastic is achieved by admixing to the plastic a foreign substance of high thermal conductivity whose concentration in the plastic increases in the direction from the inside surface toward the outside surface of the stator winding.

DESCRIPTION OF THE DRAWINGS

The subject of the invention will be described more fully in the following with reference to an example of an embodiment shown in the drawing.

FIG. 1 - side elevational view shown in section, of a d-c motor incorporating the features of this invention.

DESCRIPTION OF THE PREFERRED EMBODIMENT 1 designates a permanent-magnet rotor consisting of a shaft 2 and a permanent magnet 3. On the drive shaft side of the motor, the shaft 2 is supported in a dual bearing 4 which consists of two anti-friction bearings. The anti-friction bearings 4 are arranged in an appropriately designed end bell 5, which is bolted to a housing 6. The housing 6 has a cooling duct 7, through which cooling liquid is pumped. Into the housing 6 is placed a slotless stator return yoke 8, which surrounds a bell-shaped stator winding 9. The bell-shaped stator winding 9 is cast over with plastic and thereby becomes self supporting. The end of the shaft 2 opposite the drive side is pushed through an opening 11 provided in the bottom of the sleeve 10 (whose characteristics are described below) and is guided in an antifriction bearing 12, which is arranged in another end bell 13 bolted to the housing 6.

Through the use of a dual bearing 4 on the drive side of the motor the radial tension of compression forces, which usually occur on this motor side, are taken up by the dual bearing and do not load the anti-friction bearing 12 situated on the other side. This is particularly advantageous since the service life of the anti-friction bearing 12 is thereby enhanced with the result that this bearing need not be replaced at all, or only seldom. To replace the dual bearing 4, the permanent-magnet rotor 1 can be pulled out of the bell-shaped stator winding 9. After the dual bearing 4 is replaced the permanent-magnet rotor 1 can be examined for concentricity outside the motor and then repositioned within the stator winding 9.

Because of the slotless design of the stator return yoke 8, no surface losses occur in the permanent-magnet rotor. Thus, the heating of the permanent-magnet rotor caused by such losses is also eliminated. In order to prevent a temperature rise of the permanent-magnet rotor by heat radiation from the stator winding 9, the stator winding 9 is constructed such that it has a higher heat transfer resistance at the inside surface than at its outside surface. Therefore, the heat generated in the stator winding 9 is removed to a larger extent by the stator return yoke 8 and given off via the housing 6 to the cooling liquid flowing in duct 7. Thus the heat is kept away from the permanent-magnet 1 and the bearings 4 and 12. The thermal load on the bearings 4 and 12 is therefore not increased by the losses in the stator winding 9, but is determined solely by the friction losses in the bearing itself. Thus the motor is substantially improved for operation at high speed.

In order to achieve heat flow directed toward the outside of the stator winding 9, a separate bell-shaped sleeve 10 of insulating material, such as asbestos or any material whose thermal conductivity is less than the thermal conductivity of the plastic enclosing the stator winding is inserted inside the winding 9.

It is also possible to admix to the plastic a foreign substance, for instance, a metal powder, which has high thermal conductivity. Through a higher concentration of this foreign substance in the region of the outer surface of the stator winding 9, the thermal conductivity at the outside surface is improved and the heat is therefore conducted faster to the stator return yoke 8. If a metal powder, whose specific gravity is greater than the specific gravity of the plastic, is admixed to the plastic, a stronger concentration of the metal powder toward the outside surface of the stator winding can be achieved in a simple manner by setting the latter in rotation when it is cast. The centrifugal forces urge the metal powder outward more strongly in the still liquid plastic, and the concentration in the outer region is thereby increased.

Other variations in the above construction can be made by those skilled in the art but which, nevertheless, come within the scope of the appended claims.

What is claimed is:

1. In a commutatorless d.c. motor which includes a permanent-magnet rotor, bearing support means, a slotless stator return yoke and stator windings, means for making the thermal resistance between the stator winding and the rotor greater than the thermal resistance between the stator winding and the return yoke comprising thermal insulating means in the form of insulating material in which said stator windings are embedded, the insulating material having a greater heat transfer resistance on the side of the stator winding nearer the rotor than on the side nearer the return yoke.

2. The improvement of claim 1 wherein said stator windings are cast over with plastic, said plastic containing a metal powder of high thermal conductivity, such that the plastic covering the side of the stator winding nearer the rotor contains less of a concentration of said metal powder as compared to the side nearer the yoke.

3. The improvement of claim 1 wherein said stator windings are bell-shaped.

4. The improvement of claim 2 wherein said stator windings are bell-shaped.

5. The improvement of claim 3 wherein said thermal insulating means are bell-shaped fitting the contour of said stator windings.

6. The improvement of claim 1 wherein said bearing support means for said rotor includes:
   a. a pair of anti-friction bearings located on the drive side of said rotor; and
   b. a single anti-friction bearing located on the end of said rotor opposite said drive side.

* * * * *